(12) United States Patent
Grubb

(10) Patent No.: US 6,641,780 B2
(45) Date of Patent: Nov. 4, 2003

(54) FERRITIC STAINLESS STEEL HAVING HIGH TEMPERATURE CREEP RESISTANCE

(75) Inventor: John F. Grubb, Lower Burrell, PA (US)

(73) Assignee: ATI Properties Inc., Albany, OR (US)

(*) Notice: Subject to any disclaimer, the term of this patent is extended or adjusted under 35 U.S.C. 154(b) by 0 days.

(21) Appl. No.: 09/998,487

(22) Filed: Nov. 30, 2001

(65) Prior Publication Data

US 2003/0124019 A1 Jul. 3, 2003

(51) Int. Cl.[7] ............... C22C 38/22; C22C 38/26; C22C 38/28; C21D 9/00
(52) U.S. Cl. ............... 420/68; 420/69; 148/607; 148/325; 148/326
(58) Field of Search .............. 420/68, 69; 148/607, 148/325, 326

(56) References Cited

U.S. PATENT DOCUMENTS

| | | |
|---|---|---|
| 3,807,991 A | 4/1974 | Gregory et al. |
| 3,957,544 A | 5/1976 | Pinnow et al. |
| 4,047,981 A | 9/1977 | Arnold et al. |
| 4,059,440 A | 11/1977 | Takemura et al. |
| 4,261,739 A | 4/1981 | Douthett et al. |
| 4,286,986 A | 9/1981 | Borneman |
| 4,640,722 A | 2/1987 | Gorman |
| 4,703,885 A | 11/1987 | Lindgren et al. |
| 5,563,003 A | 10/1996 | Suzuki et al. |
| 5,624,769 A | 4/1997 | Li et al. |
| 5,626,817 A | 5/1997 | Sawaragi et al. |
| 5,942,184 A * | 8/1999 | Azuma et al. ............... 420/69 |

OTHER PUBLICATIONS

"Suitability of Ferritic Steels for Application as Construction Materials for SOFC Interconnects" W. J. Quadakkers, T. Malkow, J. Pirón–Abellán, U. Flesch, V. Shemet, L. Singheiser, Proceedings of the 4th European Solid Oxide Fuel Cell Forum, Jul. 10–14, 2000, Lucerne, Switzerland, pp. 827–836.

*Alloy Digest*, Jan. 1979, Allegheny Ludlum E–Brite 26–1 Alloy.

*Alloy Digest*, Dec. 1986, Allegheny Ludlum AL 29–4–2.

*Alloy Digest*, Apr. 1997, ALFA–IV Alloy.

* cited by examiner

Primary Examiner—Deborah Yee
(74) Attorney, Agent, or Firm—Kirkpatrick & Lockhart LLP

(57) ABSTRACT

A ferritic stainless steel having improved high temperature mechanical properties includes greater than 25 weight percent chromium, 0.75 up to 1.5 weight percent molybdenum, up to 0.05 weight percent carbon, and at least one of niobium, titanium, and tantalum, wherein the sum of the weight percentages of niobium, titanium, and tantalum satisfies the following equation:

$$0.4 \leq (\%Nb + \%Ti + \tfrac{1}{2}(\%Ta)) \leq 1.$$

The coefficient of thermal expansion of the ferritic stainless steel is within 25 percent of the CTE of stabilized zirconia between 20° C. (68° F.) and 1000° C. (1832° F.), and the steel exhibits at least one creep property selected from creep rupture strength of at least 1000 psi at 900° C. (1,652° F.), time to 1% creep strain of at least 100 hours at 900° C. (1652° F.) under load of 1000 psi, and time to 2% creep strain of at least 200 hours at 900° C. (1652° F.) Under load of 1000 psi. The steel is particularly suited for high temperature applications including, but not limited to, current collecting interconnects in solid oxide fuel cells, furnace hardware, equipment for the chemical process, petrochemical, electrical power generation, and pollution control industries, and equipment for handling molten copper and other molten metals.

20 Claims, 9 Drawing Sheets

FERRITIC STAINLESS STEEL HAVING HIGH TEMPERATURE CREEP RESISTANCE

CROSS REFERENCE TO RELATED APPLICATIONS

Not applicable.

STATEMENT REGARDING FEDERALLY SPONSORED RESEARCH OR DEVELOPMENT

Not applicable.

TECHNICAL FIELD AND INDUSTRIAL APPLICABILITY OF THE INVENTION

The present invention is directed to a ferritic stainless steel alloy. More particularly, the present invention is directed to a ferritic stainless steel alloy having microstructural stability and mechanical properties making it particularly suited for high temperature applications. Such applications include, but are not limited to, current collecting interconnects in solid oxide fuel cells, furnace hardware, equipment for the chemical process, petrochemical, electrical power generation, and pollution control industries, and equipment for handling molten copper and other molten metals.

DESCRIPTION OF THE INVENTION BACKGROUND

Fuel cells are highly efficient, environmentally friendly means for generating electric power. The basic principle behind the operation of fuel cells is the generation of electricity by the combustion of fuel. The fuel is separated from an oxidizer by a permeable barrier known as an electrolyte. Hydrogen atoms on the fuel side of the electrolyte are ionized. The resulting protons pass through the electrolyte, while the liberated electrons travel through an external circuit. On the air side of the electrolyte, opposite the fuel side, two protons combine with an oxygen atom and two electrons to create a water molecule, liberating heat and completing the electric circuit. Energy is extracted from the process by using the electrons in the external circuit to do work. For fuel cells which run at higher temperatures, heat liberated from the reaction on the air side can also be used for fuel reformation or heating applications, increasing the efficiency of the cell's overall operation.

A type of fuel cell currently attracting much interest is the solid oxide fuel cell (SOFC). SOFC's operate at high temperatures (1450–1800° F. (788–982° C.)), which means that they can internally reform common hydrocarbon fuels such as natural gas, diesel fuel, gasoline, alcohol, and coal gas into hydrogen and carbon monoxide. Internal reformation recycles thermal energy and eliminates the need for expensive platinum group metal catalysts. Hydrogen and carbon monoxide are both used as fuel in the SOFC. Hydrogen combines with oxygen in a modification of the generic fuel cell reaction detailed previously. The electrolyte is an oxide ceramic, which is permeable to oxygen ions ($O^{2-}$), rather than to protons. Thus, the SOFC runs in a reverse direction relative to certain other fuel cell types. In addition to combusting hydrogen, carbon monoxide is oxidized to carbon dioxide at the anode, releasing heat. This is an advantage because, carbon monoxide is present in unrefined fuels and can poison low temperature fuel cells, reduce operating efficiency. Small SOFC's operate at up to about 50% efficiency. To achieve even greater efficiency, medium sized and larger SOFC's can be combined with gas turbines. The resulting efficiency of a combined SOFC-gas turbine set can reach 70%.

Several variants on the basic SOFC design exist. The electrolyte is typically a form of zirconia that has been stabilized by the addition of oxides to inhibit lattice changes and provide high ionic conductivity when heated to high temperatures. Such oxide-stabilized materials are generally known, and are referred to herein, as "stabilized zirconia". SOFC's commonly include yttria-stabilized zirconia (YSZ) as the stabilized zirconia electrolyte. A reported coefficient of thermal expansion (CTE) of YSZ, between 20° C. (68° F.) and 1000° C. (1832° C.), is about $11 \times 10^{-6}$ per ° C.

A tubular SOFC, of relatively simple construction, which operates at extremely high temperatures (1800° F. (982° C.)) and is large in size, has been developed. A tubular SOFC may be scaled up in size by increasing the size and number of individual SOFC tubes in the device. More recently, the "planar" SOFC (PSOFC) has been developed. PSOFC's are relatively compact and are constructed of stacks of flat cells. The anode and cathode plates are typically ceramic materials. Permeable nickel-zirconia cermets have also been used for the anode.

Interconnects are needed to collect the electrons generated by a fuel cell. Interconnects also function as a physical separator for the oxidizing and, reducing gas streams. Accordingly, the material used to form fuel cell interconnects should be electrically conductive, oxidation resistant, and mechanically stable, and should have thermal expansion properties substantially matching those of the ceramic components of the cell, which may be physically disposed adjacent to the interconnects. Until recently, SOFC interconnects were commonly fabricated from ceramic material that is electrically conductive at high temperatures, commonly $LaCrO_3$ doped with either CaO or SrO. Although ceramics typically are stable when subjected to high temperatures for prolonged periods, ceramics also are brittle and relatively expensive, and are poor conductors of electricity relative to metals. Certain metallic interconnects have been fabricated from a chromium-based alloy developed for that purpose. The alloy provides adequate oxidation resistance and a good thermal expansion match with stabilized zirconia. However, the powder metallurgical route used to produce the alloy makes it very expensive, which adds substantial cost to SOFC's produced from the alloy.

Fabricating SOFC interconnects from stainless steels may provide advantages over ceramics because the steels would have greater electrical conductivity and may be in a form less brittle than ceramics. However, problems associated with the use of stainless steels in SOFC interconnect applications include oxidation, thermal expansion, and creep problems. Oxidation can reduce the capacity of a stainless steel to conduct current, thereby reducing cell output over time. Standard austenitic stainless steels do not provide a good thermal expansion match with conventional SOFC electrolyte ceramics. Ferritic stainless steels that may provide a good thermal expansion match with the ceramic electrolytes typically exhibit low creep resistance. For example, tests conducted by the present inventor on several commercially available stainless steels, including E-BRITE® (UNS S44627), AL 29-4-2® (UNS S44800) and ALFA-IV® (Alloy Digest SS-677, ASM International) alloys, have demonstrated that E-BRITE® alloy has acceptable thermal expansion for SOFC use, good thermal stability, and forms the desirable $Cr_2O_3$ oxide. The creep resistance of E-BRITE® alloy, however, is less than desirable for SOFC applications.

Thus, there exists a need for an improved stainless steel alloy having high temperature creep resistance, good thermal stability, and other characteristics that make it suitable for use as current collecting interconnects in SOFC's and for use in other high temperature applications, such as in equipment for the chemical process, petrochemical, electrical power generation, and pollution control industries, as well as in furnace hardware and equipment for handling molten metals.

SUMMARY OF THE INVENTION

The present invention addresses the above-described need by providing a ferritic stainless steel including greater than 25 weight percent chromium, 0.75 up to 1.5 weight percent molybdenum, up to 0.05 weight percent carbon, and at least one of niobium, titanium, and tantalum, wherein the sum of the weight percentages of niobium, titanium, and tantalum satisfies the equation $0.4 \leq (\%Nb+\%Ti+\frac{1}{2}(\%Ta)) \leq 1$. The steel of the present invention has a CTE within about 25% of the CTE of stabilized zirconia between 20° C. (68° F.) and 1000° C. (1832° F.). The steel of the present invention also exhibits vat least one creep property selected from creep rupture strength of at least 1000 psi at 900° C. (1652° F.), time to 1% creep strain of at least 100 hours at 900° C. (1652° F.) under load of 1000 psi, and time to 2% creep strain of at least 200 hours at 900° C. (1652° F.) under load of 1000 psi.

The present invention also provides a method for making a ferritic stainless steel alloy wherein the method includes forming a steel comprising greater than 25 weight percent chromium, 0.75 up to 1.5 weight percent molybdenum, up to 0.05 weight percent carbon, and at least one of niobium, titanium, and tantalum, wherein the sum of the weight percentages of niobium, titanium, and tantalum satisfies the equation $0.4 \leq (\%Nb+\%Ti+\frac{1}{2}(\%Ta),) \leq 1$. The steel has a CTE within about 25% of the CTE of stabilized zirconia, and preferably has a CTE that is greater than and within 25% of the CTE of stabilized zirconia, between 20° C. (686° F.) and 1000° C. (1832° F). The steel also has at least one creep property selected from creep rupture strength of at least 1000 psi at 900° C. (1652° F.), time to 1% creep strain of at least 100 hours at 900° C. (1652° F.) underload of 1000 psi, and time to 2% creep strain of at least 200 hours at 900° C. (1652° F.) under load of 1000 psi. In a subsequent step, the steel is solution annealed and then cooled from the annealing temperature. Solution annealing preferably is performed at a temperature that is at least the greater of the intended service temperature of the alloy and 1600° F. (871° C.). If desired, the solution annealed stainless steel is precipitation heat treated to harden the steel.

The present invention also provides for the fabrication of articles of manufacture from the stainless steel of the present invention. The articles may be fabricated using conventional techniques.

The stainless steel of the present invention exhibits improved high temperature mechanical properties, including improved high temperature creep resistance, relative to other ferritic stainless steels. The steel also should exhibit a good thermal expansion match with YSZ, the stabilized zirconia commonly used as electrolyte in SOFC. Thus, the steel is suitable for use in SOFC's as current carrying interconnects and flow separators and may be used in place of ceramics. The steel also may be suitable for use in high stress, high temperature applications including, for example, oxygen sensor devices, certain chemical process, petrochemical, electrical power generation, and pollution control equipment, high temperature furnace hardware, and molten metal handling equipment.

The reader will appreciate the foregoing details and advantages of the present invention, as well as others, upon consideration of the following detailed description of embodiments of the invention. The reader also may comprehend additional details and advantages of the present invention upon making and/or using the stainless steel of the present invention.

DETAILED DESCRIPTION OF EMBODIMENTS OF THE INVENTION

Figure 1:
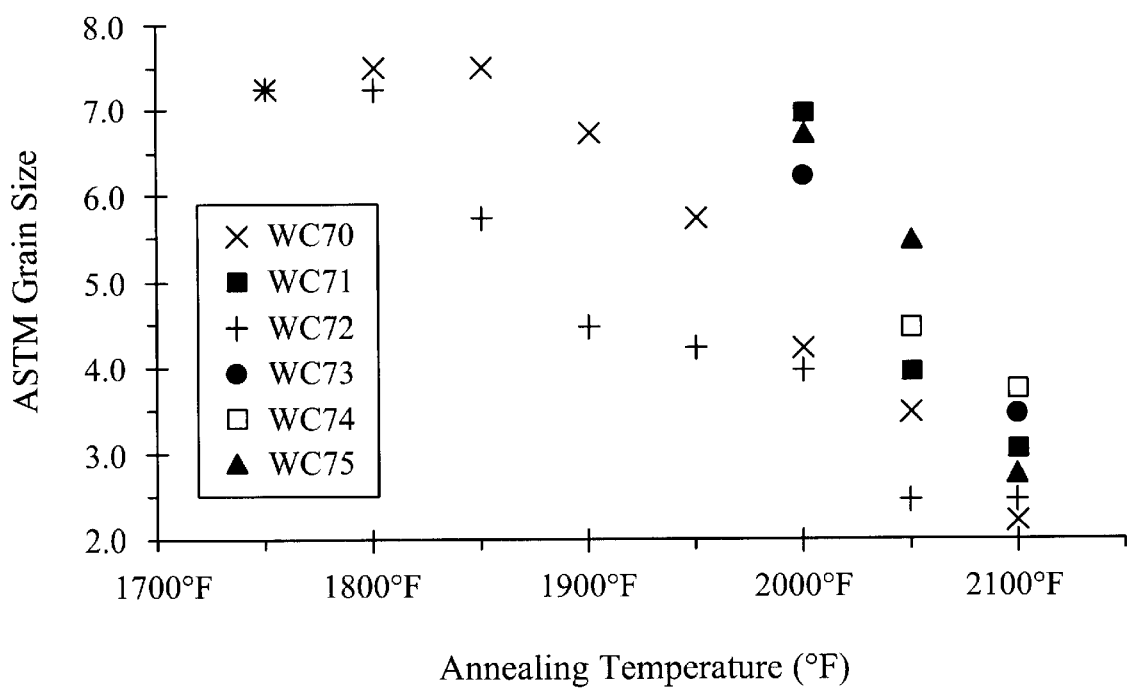
FIG. 1 is a graph of ASTM grain size as a function of annealing temperature for several ferritic stainless steels.

It was postulated that replacing ceramic SOFC interconnects with stainless steel interconnects would offer advantages. Initial work in this area, however, revealed drawbacks in the various existing stainless steels considered. For example, austenitic nickel-base materials were, found to exhibit a poor coefficient of thermal expansion ratio. Alumina-forming ferritic alloys were found deficient because they are not electrically, conductive after they oxidize.

The inventor also evaluated certain commercially available ferritic stainless steels offered by Allegheny Ludlum Corporation, Pittsburgh, Pa., under the trademarks AL 29-4-20, ALFA-IV®, and BRITE®, at elevated temperature for their suitability as interconnects in SOFC's. AL 29-4-2® alloy is described by UNS designation S44800 and is listed in several ASTM designations, including A240. The typical composition limits (in weight percentages) for AL 29-4-24 alloy are 28.0–30.0 chromium, 3:5–4.2 molybdenum, 2.0–2.5 nickel, balance iron and residual impurities. ALFA-IV®) alloy is a proprietary alloy that is generally described in U.S. Pat. No. 4,414,023, and has a nominal composition of 20 weight percent chromium, 5 weight percent aluminum, and 0.3 weight percent rare earth metals. E-BRITE® alloy is a nominally 26 weight percent chromium, 1 weight percent molybdenum stainless steel that is generally described in U.S. Pat. No. 3,807,991

AL-29-4-2® alloy was found to suffer severe embrittlement at high temperature due to extensive precipitation of sigma phase. ALFA-IV® alloy exhibited thermal expansion above a suitable level and was found to form an undesirable non-conductive $Al_2O_3$ film. E-BRITE® alloy was found generally more acceptable for SOFC interconnect applications than AL-29-4-2® and ALFA-IV® alloys, but was still unsuitable, primarily due to unacceptably low creep resistance at high temperatures.

A ferritic stainless steel having improved high-temperature mechanical properties, including improved high-temperature creep resistance, relative to the commercial form of E-BRITE® alloy would be advantageous in applications such as SOFC interconnects and in other high temperature applications. Through experimentation, the present inventor identified such a ferritic stainless steel, including greater than 25 weight percent chromium, 0.75 up to 1.5 weight percent molybdenum, up to 0.05 weight percent carbon, 0.4 up to 1 weight percent niobium. Preferably, the carbon content of the alloy is limited to 0.005 weight percent, but, as further discussed below, the presence of niobium or another carbide former such as titanium in the alloy should provide carbide stabilization up to the broader 0.05 weight percent limit.

The ferritic stainless steel of the present invention is further characterized in that it has at least one creep property selected from creep rupture strength of at least 1000 psi at 900° C. (1652° F.), time to 1% creep strain of at least 100 hours at 900° C. (1652° F.) under load of 1000 psi, and time to 2% creep strain of at least 200 hours at 900° C. (1652° F.) under load of 1000 psi.

Because YSZ is a common stabilized zirconia electrolyte in SOFC's, the steel of the present invention preferably has a CTE within about 25% of the CTE of YSZ between 20° C. (68° F.) and 1000° C. (1832° F.). As disclosed above, the CTE of YSZ within that temperature range is about $11 \times 10^{-6}$ per ° C. Thus, a range within about 25% of that GTE value is about 8.25 to about $13.75 \times 10^{-6}$ per ° C.

Minor creep and/or stress relaxation of the metallic elements of an SOFC at operating temperature will leave the device essentially stress free after some time at temperature. When the SOFC is subsequently cooled, if the CTE of the metal is less than that of the stabilized zirconia electrolyte, the metal will be placed in compression while the ceramic is placed in tension. It is well known that brittle materials preferably are loaded in compression and may fail unexpectedly when loaded in tension. Thus, it is preferable that the metal have a CTE as least as great as the oxide-stabilized ceramic. Therefore, the CTE of the ferritic stainless steel of the present invention preferably is at least as great and may be up to 25 percent greater than, the CTE of stabilized zirconia, such as YSZ, between 20° (68° F.) and 1000° C. (1832° F.).

The inventor has further discovered that to optimize the properties of the ferritic stainless steel of the invention for SOFC interconnect applications, the steel preferably is solution annealed and then cooled from the annealing temperature during processing. Solution annealing preferably is performed at a temperature that is at least the greater of the intended service temperature of the alloy and 1600° F. (871° C.). The inventor has found that annealing the alloy at excessive temperatures (for example, in excess of 2200° F. (1204° C.)) for extended times may lead to excessive grain growth, which can impair the alloy's toughness and formability. Rapid cooling from the annealing temperature, such as is produced by water quenching, was not found to be required, but is not deleterious. Very slow cooling, such as by furnace cooling, also has not been found to be necessary. Air cooling or cooling by alternate means at an equivalent rate is generally preferred. To modify certain mechanical properties of the alloy for use in applications where increased hardness is required, the solution annealed stainless steel may be precipitation heat treated by conventional means Chromium contributes to the oxidation resistance of the stainless steel and to its formation of a $Cr_2O_3$ scale that is electrically conductive at high temperatures. It also is largely responsible for reducing thermal expansion of the steel so that it generally matches that of zirconia. It is believed that steels including less than about 25 weight percent chromium would not exhibit these desired properties. As chromium content is increased above about 35 weight percent, however, the steel becomes more difficult to hot work and, therefore, more expensive to produce. Moreover, a steel including such a high chromium content would be more likely to from an undesirable intermetallic sigma (FeCr) phase. Accordingly, the chromium content preferably is no greater than about 35 weight percent, more preferably is no greater than about 30 weight percent, and even more preferably is no greater than about 27.5 weight percent.

Molybdenum reduces thermal expansion. It also provides solid solution strengthening and in conjunction with niobium forms the strengthening Laves phase $Fe_2(Nb,Mo)$ precipitate. Molybdenum, however, substantially increases the tendency of the stainless steel to precipitate the undesirable sigma phase, as well as the equally undesirable chi (Fe,Cr,Mo) phase. Molybdenum also impairs the oxidation resistance of the steel and can, under certain circumstances, promote a catastrophic form of oxidation. For these reasons, the molybdenum content of the stainless steel preferably is carefully, controlled. A molybdenum content of about 0.75 up to about 1.5 weight percent, and more preferably up to about 1.2 weight percent, provides a particularly suitable balance between the desirable and undesirable influences of the element on the alloy's properties. In particular, experimental alloys produced by the inventor including 0.9 to 1.1 weight percent molybdenum exhibited a particularly desirable balance of properties.

The role of carbon in ferritic stainless steels is well known. Carbon contents less than about 0.010 weight percent are required to obtain ductility in unstabilized alloys. To optimize properties, carbon contents less than 0.005 weight percent are needed. The niobium content of the stainless steel of the present invention, however, Will mitigate many of the effects of the carbon. For this reason, carbon contents up to about 0.05 weight percent are acceptable if sufficient carbide forming elements are present to stabilize the carbon content. One having ordinary skill in the art may readily determine the content of carbide forming elements that must be present in a given alloy of the present invention to stabilize a given carbon content. If welded articles are to be formed from a steel of the present invention, it may be preferable to respect the preferred 0.005 weight percent upper limit to prevent hot cracking of the welds.

Small additions of niobium have been found to improve creep or "sag" resistance in ferritic stainless steels. These niobium additions, under the right circumstances, produce a fine dispersion of Laves phase (Fe$_2$(Ta,Nb,Mo)) precipitates. The suitable content of niobium in the stainless steel of the invention was determined through experimentation, as described below. It is believed that titanium maybe substituted for a portion of the niobium in the alloy. In addition, tantalum is similar to niobium in its influence on the properties of the alloy, but is heavier and substantially more costly than niobium. It is believed that tantalum may be substituted for niobium and titanium in whole or in part on the basis that 2 weight percent tantalum is equivalent to 1 weight percent niobium and titanium. Thus, it is believed that the improved properties of the stainless steel of the invention observed by the inventor may be achieved by including in the steel at least one of niobium, titanium, and tantalum, wherein the sum of the weight percentages of niobium, titanium, and tantalum satisfies the following equation:

$$0.4 \leq (\%Nb + \%Ti + \tfrac{1}{2}(\%Ta)) \leq 1$$

Preferably, the steel of the invention includes no more than 0.50 weight percent titanium.

One benefit of adding titanium to the stainless steel of the present invention is that it will remove nitrogen from solution as TiN. This will better prevent the formation of NbN and CrNbN precipitates, thus preserving the niobium (a more costly alloying addition than titanium) for the formation of desirable Laves (Fe$_2$Nb) phase strengthening precipitates. It is also believed that the addition of titanium may similarly remove carbon from solution and thereby better prevent formation of NbC and NbCN. It also has been observed that titanium in amounts above about 0.07 weight percent appears to mitigate the problem of niobium-induced weld cracking.

To better ensure a significant improvement in high temperature properties while limiting costs associated with the alloying additions, the sum of the weight percentages of niobium, titanium, and tantalum in the steel of the present invention is more narrowly controlled to satisfy the following equation:

$$0.5 \leq (\%Nb + \%Ti + \tfrac{1}{2}(\%Ta)) \leq 0.75$$

wherein the maximum and preferred contents of titanium are the same as for the previous equation.

In addition, to the foregoing elements, the ferritic stainless steel of the present invention may include additions of one or more rare earth elements. These optional rare earth additions include, but are not limited to, up to about 0.1 weight percent cerium and up to 0.05 weight percent lanthanum. Additions of rare earth elements as alloy additions have been shown to be highly beneficial for increasing the oxidation resistance of iron-base alloys. Such effect has been demonstrated for yttrium, lanthanum, and cerium. The other rare earth elements tend progressively to be more costly and less effective, but can be used for that purpose. It is not necessary to add only a single rare earth metal (REM) when adding such elements to the stainless steel of the present invention. The commercially produced mixture of REM elements known as mischmetal can be used to provide economical REM doping. As is known in the art, mischmetal is a naturally derived mixture of metallic rare earth elements containing about 50 weight percent cerium, with the remainder principally lanthanum and neodymium.

Various mechanisms have been proposed for the effect of rare earth elements on the oxidation resistance of metal alloys. Currently, the most widely accepted mechanism is based on the modification of internal surfaces, such as oxide/oxide grain boundaries and oxide/metal interface. A modification to this mechanism is the "poisoned interface" model, in which REM atoms tie up sulfur at the oxide/metal interface. Acceptance of this mechanism is supported by the finding that reducing sulfur in REM-free alloys to ultra-low levels (less than 1 ppm) has much the same effect as adding REM to alloys with typical sulfur contents (3–100 ppm). Other theories that have been proposed include increased scale plasticity, promotion of protective oxide formation, and mechanical keying of the scale to the metal by formation of rare earth oxide pegs. Regardless of the actual mechanism, it is the increased corrosion resistance offered by REM addition that is significant to the present invention. It is important not to add too great an amount of REM, because these elements have limited solubility in iron-based alloys, and the excess solute forms undesirable intermetallic phase, deep eutectics, or both, with very significant impairment of hot workability. High levels of REM also may lead to "overdoping", which is characterized by the formation of islands of REM oxides and increased oxidation rates.

The addition of other non-REM elements also may provide enhanced. oxidation resistance. In particular, hafnium provides a benefit similar to that provided by REM addition. Hafnium is, however, very expensive. Zirconium is of much lower cost and can be substituted in amounts similar to hafnium, although zirconium is less effective. Just as with the REM elements the amount of zirconium and/or hafnium included in the alloy should not be too great or excessive amounts of undesirable intermetallic phases will be formed. Therefore, hafnium and/or zirconium may be included in the alloy in a combined amount that is up to about 0.05 weight percent.

Additions of other alloying elements and additives as are known in the art to improve or provide additional characteristics to the alloy also may be made. Such additions include, for example, silicon, aluminum, tungsten, and manganese. Silicon is used in steelmaking as a deoxidizer. It promotes the precipitation of Laves phase, but also the undesirable sigma phase. In solid solution, silicon hardens ferrite and makes it brittle. Thus, if present, the silicon content of the present alloy preferably is limited to less than about 1 weight percent, and more preferably is less than about 0.5 weight percent.

Aluminum is both a deoxidizer and a hardener. Since aluminum is a more effective deoxidizer than silicon, a lower residual content of aluminum is required to produce complete oxidation. Aluminum content, if present, preferably is less than about 0.25 weight percent, and more preferably will be in the range of about 0.002 to about 0.05 weight percent.

Tungsten is generally similar to molybdenum in effect, but is heavier; more expensive, and more difficult to melt into the alloy. It may be introduced along with molybdenum, but if present is preferably held to levels less than about 0.25 weight percent.

Manganese is intentionally added to carbon steels for the mitigation of sulfur-induced hot shortness. It is typically present in stainless steels, but in the present alloy preferably is limited to less than about 1 weight percent, and more preferably is limited to less than about 0.5 weight percent.

Unavoidable impurities may be present in the stainless steel of the invention. Among those of significance are nitrogen, copper, sulfur, and phosphorus Molten Fe—Cr alloys readily absorb nitrogen when in contact with air. As such an alloy's chromium content is increased above about 18 weight percent, removal of nitrogen becomes increasingly difficult. Nitrogen in ferritic stainless steels frequently produces embrittlement, either through chromium or aluminum nitride precipitation. The nitrogen content of the steel of the present invention preferably is limited to less than about 0.04 weight percent, and is more preferably limited to less than about 0.010 weight percent. Sulfur is an inevitable impurity in steelmaking, and one that is generally undesirable. It is easily removed during argon oxygen decarburization (AOD) refining, but not during vacuum induction, melting (VIM) refining. As is known to those of ordinary skill in the art, AOD is a secondary refining process for the controlled oxidation of carbon in a steel melt in which oxygen, argon, and nitrogen are injected into a molten metal bath through submerged, side-mounted tuyeres. VIM is a refining and remelting process in which metal is melted inside a vacuum chamber by induction heating.

Sulfur is preferably reduced to the lowest readily attainable level, and in any case preferably should be no more than about 0.010 weight percent. Phosphorus is a solid solution strengthener of steels, and may produce brittleness. Phosphorus is not readily removed from stainless steels, so cannot easily be reduced to extremely low levels, but preferably is restricted to less than about 0.050 weight percent. Copper is not readily removed during steelmaking, but is mostly innocuous. High levels of copper (greater than about 2 weight percent) impair the hot ductility and hot workability of ferritic stainless steels. In E-BRITE® alloy, copper is limited to no more than about 0.025 weight percent to better provide resistance to stress corrosion cracking (SCC) in boiling magnesium chloride solutions. High resistance to SCC is not a specific goal of the present invention, and copper is preferably limited to less than about 0.25 weight percent.

Prior to performing tests to determine the properties of various ferritic stainless steels, six fifty-pound heats, designated WC70 through WC75, having the compositions set forth in Table 1 below, were prepared by VIM. All figures shown are weight percentages of the entire heat weight.

TABLE 1

| | Heat | | | | | |
|---|---|---|---|---|---|---|
| | WC70 | WC71 | WC72 | WC73 | WC74 | WC75 |
| C | 0.0026 | 0.0026 | 0.0038 | 0.0022 | 0.0023 | 0.0033 |
| Mn | 0.054 | 0.055 | 0.060 | 0.049 | 0.052 | 0.053 |
| P | 0.010 | 0.010 | 0.010 | 0.010 | 0.010 | 0.010 |
| S | 0.0029 | 0.0027 | 0.0014 | 0.0011 | 0.0003 | 0.0006 |
| Si | 0.16 | 0.15 | 0.14 | 0.15 | 0.15 | 0.15 |
| Cr | 25.52 | 25.98 | 25.63 | 25.77 | 25.69 | 25.79 |
| Ni | 0.096 | 0.094 | 0.095 | 0.094 | 0.094 | 0.095 |
| Mo | 1.05 | 1.05 | 1.03 | 1.04 | 1.04 | 1.04 |
| Al | 0.002 | 0.002 | 0.002 | 0.002 | 0.002 | 0.002 |
| Nb | 0.12 | 0.68 | 0.13 | 0.68 | 0.71 | 0.71 |
| Ce | <0.001 | <0.001 | 0.001 | 0.003 | 0.042 | 0.009 |
| La | <0.001 | <0.001 | 0.001 | 0.001 | 0.016 | 0.003 |
| Zr | <0.001 | <0.001 | <0.001 | <0.001 | <0.001 | 0.011 |
| N | 0.0010 | 0.0010 | 0.0008 | 0.0009 | 0.0011 | 0.0011 |

Heats WC70 and WC72 are representative of a standard ferritic stainless steels having 0.37 weight percent or less niobium and 0.001 weight percent or less of each of cerium, lanthanum, and zirconium. The compositions found in the heats WC70 and WC72 are typical of E-BRITE® ferritic stainless steel. Heats WC71, WC73, WC74, and WC75 have the general composition of the standard alloy, with the following modifications made by the present inventor: the WC71 heat includes increased niobium content; the WC73 heat includes niobium and cerium; the WC74 heat includes niobium, cerium, and lanthanum; and the WC75 heat includes niobium, cerium, lanthanum, and zirconium. In Table 1, the use of "<0.001" in connection with cerium, lanthanum, and zirconium indicates that no intentional addition of these elements was made and that chemical analysis showed that the alloys lacked any significant amount of the elements. As discussed below, the present inventor's modifications to the standard E-BRITE® alloy, composition provide significant improvement in microstructural stability, mechanical properties, and high temperature creep resistance.

The heats of Table 1 were cast to ingots and processed prior to testing. Each ingot was cross rolled at 2200° F. (1204° C.), spreading the ingot to a bar 5 inches (127 mm) in width. As is known in the art, cross rolling is the rolling of metal article in rolling directions of about ninety degrees from the direction of a previous rolling. The cross rolled bar was then hot rolled at a temperature of at least 210° F. (1149° C.) with a sufficient number of passes through a series of rolling stands to provide a 0.125 inch (3.18 mm) thick band. The hot rolled band was then water quenched, shot blasted, pickled clean, and then cold rolled to a 0.040 inch (1.02 mm) thick strip.

Following cold rolling, samples of the strip formed from each of the Table 1 heats were retained for recrystallization studies. The remainder of each strip was line annealed at 1980° F. (1082° C.) (WC71–WC75 alloys) or at 1725° F. (941° C.) (WC70 alloy) for 30 seconds time-at-temperature. Following annealing, each strip was descaled by brief immersion in molten sodium salts, and then pickled clean in a mixture of sulfuric, nitric, and hydrofluoric acids. A portion of the annealed 0.040 (1.02 mm) thick material was further cold rolled to foil (0.002 inch/0.051 mm thick) for strip life cyclic oxidation testing.

A variety of tests, discussed below, were performed on the fully processed strips formed from each heat to determine the microstructural stability, mechanical properties, creep/rupture strength, and oxidation resistance of the six alloy compositions at temperatures representative of SOFC operation.

I. Recrystallization Study

Samples of the 0.040 (1.02 mm) thick strip from each heat, which had previously been annealed, pickled and cold rolled, were evaluated for microstructural stability. Coupons from each heat were annealed in a muffle furnace at temperatures ranging from 1750–2000° F. (954–1093° C.) for thirty seconds time-at-temperature to simulate production continuous anneal exposures. Longitudinal sections were then mounted and polished for metallographic examination. Grain size was evaluated per ASTM standard E112 both at the sample centerline and near the sample surface. Tables 2 (centerline measurements) and 3 (measurement near sample surface) provide ASTM grain size results. Grain size measurements differing at two different points on the same sample are indicated as, for example, "7.0/7.5". The larger the grain size number, the smaller the grain size.

TABLE 2

| | Centerline Measurements | | | | | |
|---|---|---|---|---|---|---|
| Annealing | Heat Number | | | | | |
| Temperature | WC70 | WC71 | WC72 | WC73 | WC74 | WC75 |
| 1750° F. (954° C.) | 7.0/7.5 | — | 7.0/7.5 | — | — | — |

TABLE 2-continued

Centerline Measurements

| Annealing Temperature | Heat Number | | | | | |
|---|---|---|---|---|---|---|
| | WC70 | WC71 | WC72 | WC73 | WC74 | WC75 |
| 1800° F. (982° C.) | 7.5 | — | 7.0/7.5 | — | — | — |
| 1850° F. (1010° C.) | 7.0/8.0 | — | 5.0/6.5 | — | — | — |
| 1900° F. (1038° C.) | 6.0/7.5 | — | 4.5 | — | — | — |
| 1950° F. (1066° C.) | 4.5/7.0 | — | 4.0/4.5 | — | — | — |
| 2000° F. (1093° C.) | 3.0/5.5 | 6.5/7.5 | 4.0 | 6.0/6.5 | — | 6.5/7.0 |
| 2050° F. (1121° C.) | 3.0/4.0 | 3.0/5.0 | 2.5 | 4.0 | 4.0/5.0 | 5.0/6.0 |
| 2100° F. (1148° C.) | 2.0/2.5 | 3.0 | 2.5 | 3.5 | 3.5/4.0 | 2.0/3.5 |

As indicated by the results of Table 2, which include measurements taken at the sample centerline after annealing, the alloy of heats WC70 and WC72, which have only trace levels of niobium and rare earth elements, readily recrystallized at 1750° F. (954° C.) and experienced significant grain growth, at temperatures of about 1950° F. (1066° C.) and above. The alloys having greater than trace amounts of niobium (heat WC71), niobium and cerium (heat WC73), and niobium, cerium, lanthanum, and zirconium (heat WC75) did not show evidence of recrystallization until about 2000° F. (1093° C.). The alloy containing greater than trace amounts of niobium, cerium, and lanthanum (heat WC74) did not show recrystallization until about 2050° F. (1121° C.). These results show that the addition of niobium, either alone or in conjunction with rare earth elements and zirconium, delays recrystallization by a minimum of 200° F. (93° C.) as compared to the unmodified form of the ferritic alloy.

TABLE 3

Measurements at Sample Surface

| Annealing Temperature | Heat Number | | | | | |
|---|---|---|---|---|---|---|
| | WC70 | WC71 | WC72 | WC73 | WC74 | WC75 |
| 1750° F. (954° C.) | 8.5/9.5 | — | 9.0 | — | — | — |
| 1800° F. (982° C.) | 8.5/9.0 | — | 8.5 | — | — | — |
| 1850° F. (1010° C.) | 6.0/7.5 | — | 8.0 | — | — | — |
| 1900° F. (1038° C.) | 7.0/7.5 | — | 7.5 | — | — | — |
| 1950° F. (1066° C.) | 4.5/7.0 | — | 4.0/4.5 | — | — | — |
| 2000° F. (1093° C.) | 5.0/5.5 | 8.0 | 4.0 | 7.5 | — | 7.5/8.0 |
| 2050° F. (1121° C.) | 3.0/4.0 | 7.5 | 2.5 | 6.5 | 4.0/5.0 | 7.0 |
| 2100° F. (1148° C.) | 2.0/2.5 | 3.0 | 2.5 | 7.0 | 3.5/4.0 | 2.0/3.5 |

The results shown in Table 3, which includes grain size measurements taken near the sample surface after annealing, are quite similar to those in Table 2. It should be noted that the sample of heat WC71 tested at 1750° F. (954° C.) represents a non-equiaxed microstructure. The samples having a standard ferritic stainless steel composition, heats WC70 and WC72, did exhibit recrystallization beginning at about 1750° F. (954° C.), and significant recrystallization was observed at 1950° F. (1066° C.) and above. Again, the inventor's modified ferritic alloys did not show recrystallization until above 1950° F. (1066° C.), With the niobium, cerium, and lanthanum-containing alloy (heat WC74) exhibiting no evidence of recrystallization until 2000° F. (1093° C.). Accordingly, the addition of niobium, either alone or in conjunction with zirconium and rare earth elements including, but not limited to, cerium and lanthanum, delayed recrystallization by at least 200° F. (93° C.).

FIG. 1 graphically demonstrates the effect of the addition of niobium, alone or in combination with rare earth elements, on the recrystallization of the various alloys. As indicated.above in the discussion of Tables 2 and 3, recrystallization is delayed by at least 200° F. (93° C.) in the alloys having increased niobium, either alone or in addition to one or more rare earth elements, including cerium, lanthanum, and zirconium.

Without intending to be bound to any particular theory, it appears that the modified alloys' (including WC73–WC75) resistance to recrystallization is the result of the presence of Laves phase precipitates in the samples. Laves phase is an intermetallic phase that contributes to abrasion resistance, but that severely limits an alloy's material ductility and impact resistance. Metallographic analysis of annealed 0.040 inch (1.02 mm) thick material revealed that the standard alloy (heat WC70) contains few Laves phase precipitates, while the modified alloys tested contained a significant fraction of Laves phase distributed Within grains and on grain boundaries. These precipitates interfere with grain boundary motion and so impede grain growth. Thus, the modified alloys have greater grain size stability than does the standard alloy.

II. Mechanical Testing

Tensile specimens were machined from 0.040 inch (1.02 mm) thick annealed strip and tested. Elevated temperature testing was done in ASTM E21. Longitudinal tensile properties, calculated as the average properties of a minimum of two samples per alloy, are shown in Table 4 and FIG. 2.

TABLE 4

| Heat | Test temperature | Hardness (Rb) | Yield stress (psi) | Tensile stress (ksi) | Elongation (%) |
|---|---|---|---|---|---|
| WC70 | 77° F. (25° C.) | 79.0 | 49,600 | 76,500 | 27 |
| | 1472° F. (800° C.) | | 4,367 | 6,767 | 67 |
| | 1562° F. (850° C.) | | 4,533 | 5,600 | 98 |
| | 1652° F. (900° C.) | | 3,100 | 4,233 | 76 |
| WC71 | 77° F. (25° C.) | 84.0 | 52,900 | 80,000 | 27 |
| | 1472° F. (800° C.) | | 7,300 | 10,160 | 50 |
| | 1562° F. (850° C.) | | 4,433 | 6,700 | 30 |
| | 1652° F. (900° C.) | | 3,475 | 5,450 | 56 |
| WC73 | 77° F. (25° C.) | 84.4 | 51,300 | 79,700 | 26 |
| | 1472° F. (800° C.) | | 5,800 | 8,520 | 46 |
| | 1562° F. (850° C.) | | 5,600 | 7,567 | 50 |
| | 1652° F. (900° C.) | | 3,567 | 5,733 | 58 |
| WC75 | 77° F. (25° C.) | 84.6 | 49,300 | 80,900 | 23 |
| | 1472° F. (800° C.) | | 6,567 | 9,733 | 56 |
| | 1562° F. (850° C.) | | 4,950 | 7,275 | 67 |
| | 1652° F. (900° C.) | | 3,433 | 5,667 | 85 |

Figure 2:
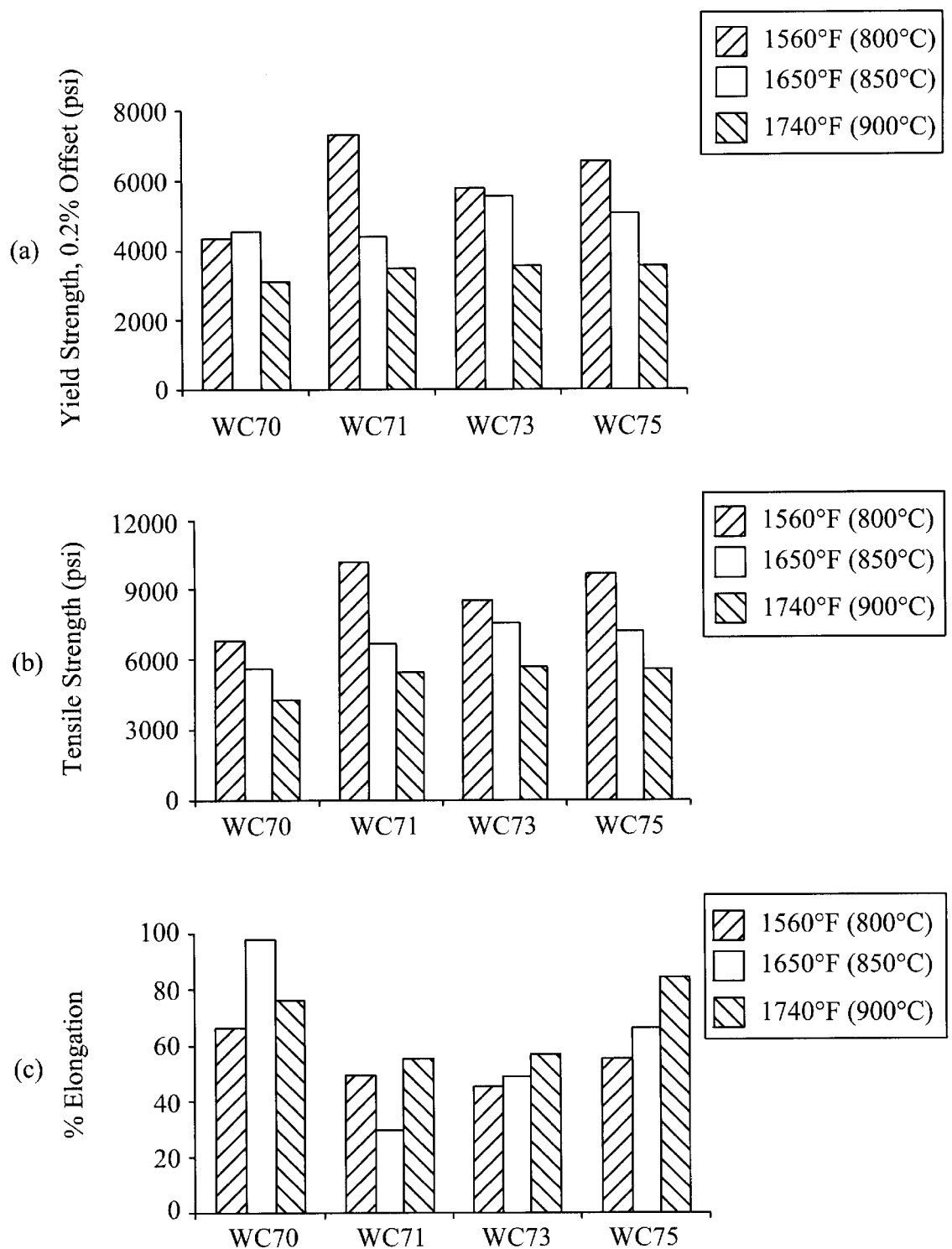
FIGS. 2(a)–(c) are graphs illustrating several mechanical properties for several ferritic stainless steels tested at various temperatures.

As shown in Table 4 and FIG. 2, the modified heats (heats WC71, WC73, and WC75) exhibited higher yield and ultimate tensile strength values at elevated temperatures, at the expense of generally slightly reduced elongation (0.2% offset). Samples that broke on or outside gauge marks were excluded from the average elongation calculation.

As seen in Table 4, yield strength was greater for the modified alloys (heats WC71, WC73, and WC75) than for the standard alloy (heat WC70) at each test temperature, with one exception. The only anomalous result was seen with the heat WC71 alloy at 1562° F. (850° C.).

Tensile strength was greater for the modified alloys than for the standard alloy at all elevated temperatures without exception. Typically, alloy hardness is analogous to alloy tensile strength. Such was the case in the present situation. In looking at Table 4, one observes that the modified alloys not only have a greater hardness value than the standard alloy, but also have a greater tensile strength. Accordingly, the modified alloys possess mechanical properties superior to those of the standard alloy.

III. Creep and Stress Rupture Testing

Creep is time-dependent strain occurring under stress. Creep strain occurring at a diminishing rate is called primary creep; that occurring at a minimum and almost constant rate, secondary creep; and that occurring at an accelerating rate, tertiary creep. Creep of SOFC interconnects at elevated temperatures can cause a loss of cell integrity, resulting in gas leakage. Creep strength is the stress that will cause a given creep strain in a creep test at a given time in a specified constant environment. The creep strength of the standard E-BRITE® alloy, such as is embodied in heats WC70 and WC72, has been determined to be inadequate in the temperatures and stresses encountered in SOFC applications. The inventive modifications made to the standard alloy, however, have been shown to significantly improve creep resistance.

Creep-rupture strength is the stress that causes fracture in a creep test at a given time, in a specified constant environment. A test for creep-rupture is one in which progressive specimen deformation and the time for rupture are both measured. Creep-rupture testing was performed using 0.040 inch (1.02 mm) thick material from the standard alloy (heat WC70) and from modified alloys (heats WC71, WC73, and WC75). The standard alloy samples were annealed at 1715–1735° F. (935–946° C.) for 60 seconds time-at-temperature to yield an ASTM grain size of 8–9. Samples of the three modified alloys were annealed at 1970–1990° F. (1077–1088° C.) for 30 seconds time-at-temperature and had grain sizes of approximately ASTM 8. The goal of the test was to evaluate the effect on creep strength of the alloying additions in the modified alloys. Because grain size has been shown to be of great importance with respect to creep and creep-rupture resistance, the fact that both the modified and unmodified alloys had similar grain size (within 1–2 ASTM grain size numbers) demonstrates that the observed variations in creep resistance are due to composition and precipitation state.

Figure 3:
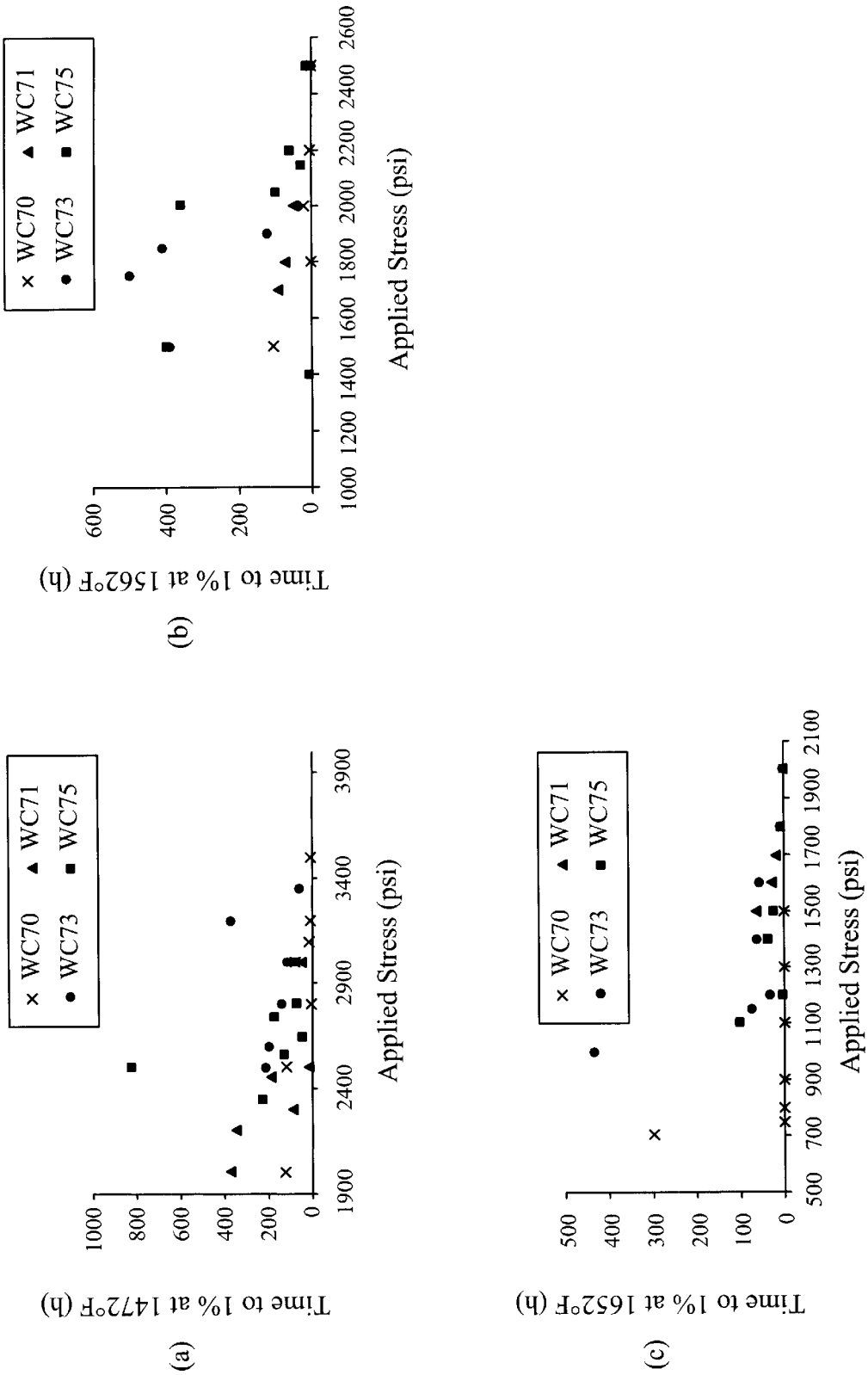
FIG. 3 is a graph of time to 1% creep strain as a function of applied stress for several tested ferritic stainless steels attest temperatures of (a) 800° C. (1472° F.), (b) 850° C. (1562° F.), and (c) 900° C. (1652° F.)
Figure 4:
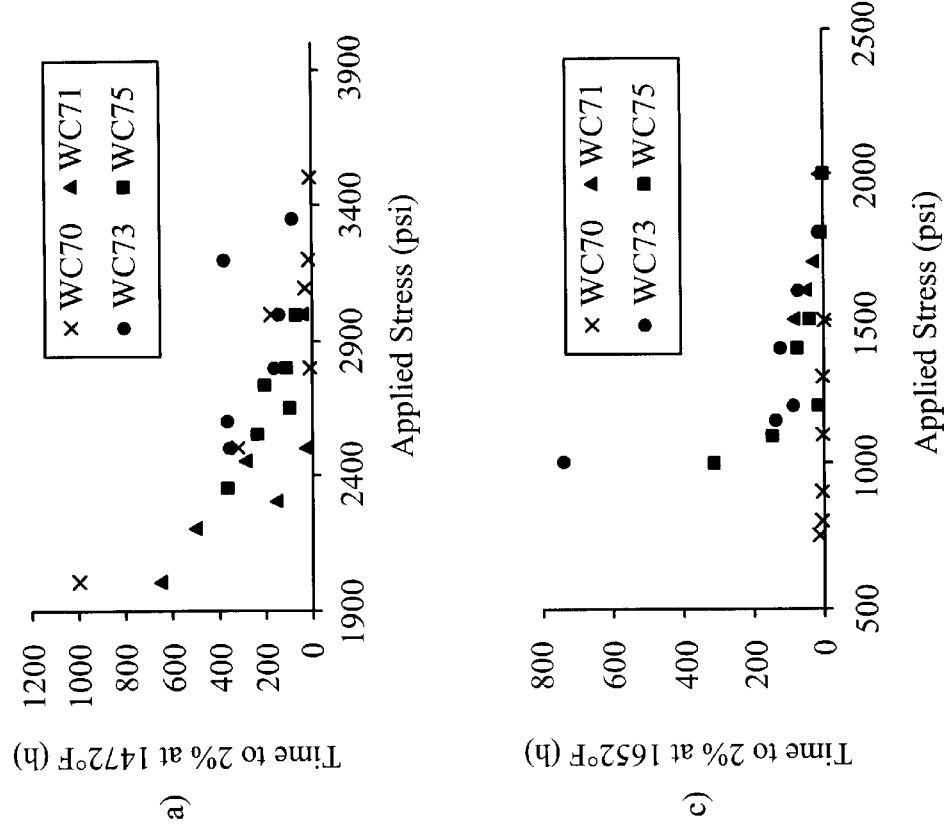
FIG. 4 is a graph of time to 2% creep strain as a function of applied stress for several ferritic stainless steels at test temperatures of (a) 800° C. (1472° F.), (b) 850° C. (1562° F.), and (c) 900° C. (1652° F.)
Figure 5:
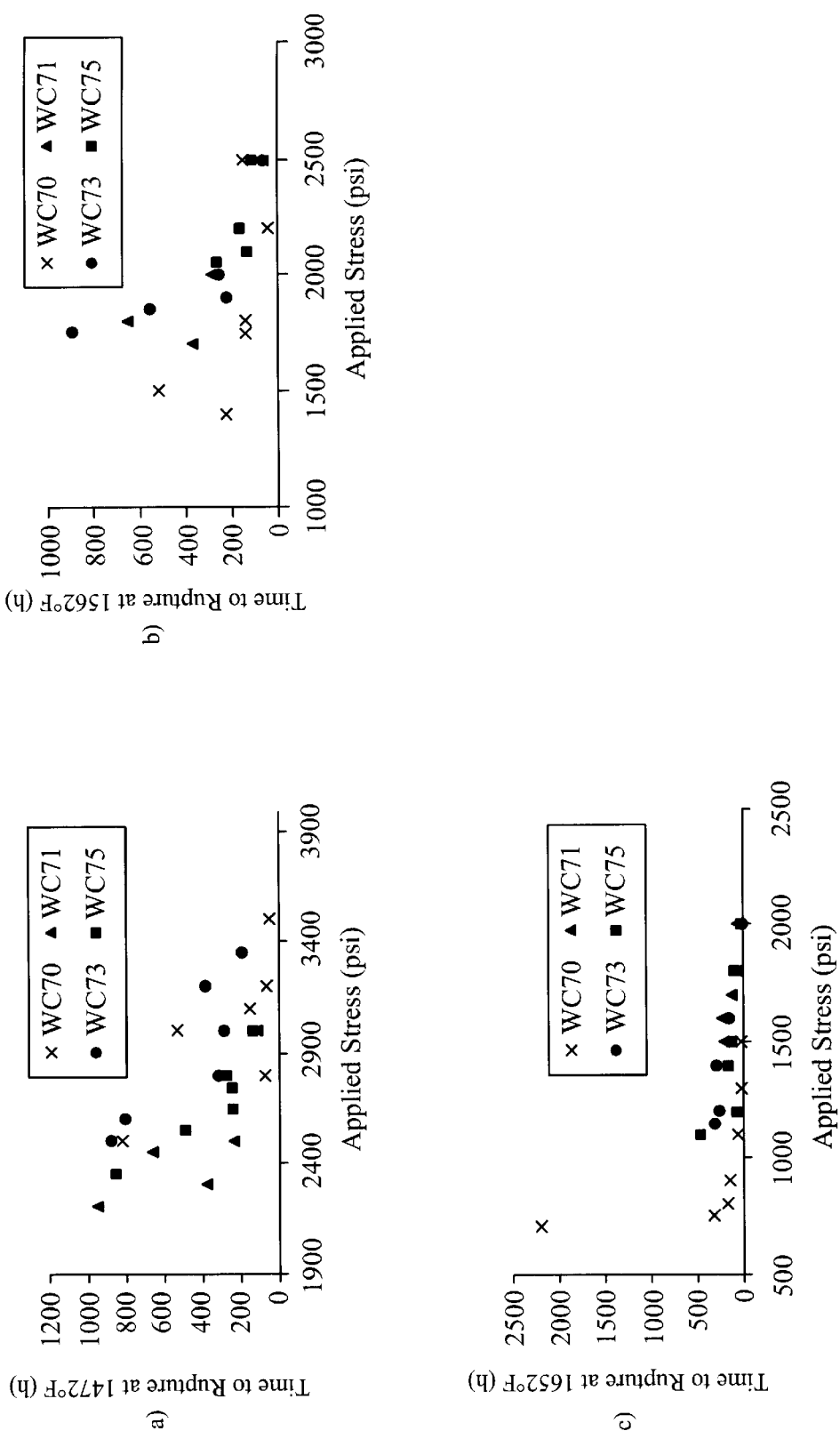
FIG. 5 is a graph of time to rupture as a function of applied stress for several ferritic stainless steels at temperatures of (a) 800° C. (1472° F.), (b) 850° C. (1562° F.), and (c) 900° C. (1652° F.)

Creep-rupture blanks were machined from 0.040 inch (1.02 mm) thick annealed strip in the longitudinal direction. Creep-rupture tests were conducted according to ASTM E139 to determine the time to 1% creep strain (FIGS. 3(a)–(c)), 2% creep strain (FIGS. 4(a)–(c)), and rupture (FIGS. 5(a)–(c)) at 800° C. (1472° F.), 850° C. (1562° F.), and 900° C. (1652° F.) for times up to 1000 hours and at applied stresses up to 3500 psi. Results are presented in FIGS. 3–5. The data included in FIGS. 3–5 is provided in the following Tables 5–16.

TABLE 5

Heat WC70, time to 1% creep strain

| TEMPERATURE | STRESS (psi) | TIME(hrs) |
|---|---|---|
| 1472° F.(800° C.) | 2,000 | 125.0 |
|  | 2,500 | 120.0 |
|  | 2,800 | 3.8 |
|  | 3,000 | 50.0 |
|  | 3,100 | 11.0 |
|  | 3,200 | 6.8 |
|  | 3,500 | 4.8 |
|  | 1,500 | 110.0 |
|  | 1,800 | 4.0 |
| 1562° F.(850° C.) | 2,000 | 23.0 |
|  | 2,200 | 8.0 |
|  | 2,500 | 6.0 |
|  | 700 | 300.0 |
|  | 750 | 3.8 |
|  | 750 | 5.0 |
|  | 800 | 4.0 |
|  | 800 | 4.0 |
| 1652° F.(900° C.) | 900 | 2.5 |
|  | 1,100 | 1.0 |
|  | 1,100 | 1.0 |
|  | 1,300 | 2.3 |
|  | 1,500 | 1.0 |

TABLE 6

Heat WC70, time to 2% creep strain

| TEMPERATURE | STRESS (psi) | TIME(hrs) |
|---|---|---|
| 1472° F.(800° C.) | 2,000 | 1000.0 |
|  | 2,500 | 320.0 |
|  | 2,800 | 9.5 |
|  | 3,000 | 160.0 |
|  | 3,100 | 31.0 |
|  | 3,200 | 15.5 |
|  | 3,500 | 9.8 |
|  | 1,500 | 300.0 |
|  | 1,800 | 8.8 |
| 1562° F.(850° C.) | 2,000 | 39.5 |
|  | 2,200 | 17.5 |
|  | 2,500 | 23.0 |
|  | 700 | 400.0 |
|  | 750 | 15.0 |
|  | 750 | 15.0 |
|  | 800 | 8.0 |
|  | 800 | 8.0 |
| 1652° F.(900° C.) | 900 | 5.0 |
|  | 1,100 | 2.0 |
|  | 1,100 | 2.0 |
|  | 1,300 | 4.5 |
|  | 1,500 | 1.5 |

TABLE 7

Heat WC70, time to rupture

| TEMPERATURE | STRESS (psi) | TIME(hrs) |
|---|---|---|
| 1472° F.(800° C.) | 2,500 | 822.5 |
|  | 2,800 | 77.5 |
|  | 3,000 | 537.4 |
|  | 3,100 | 160.1 |
|  | 3,200 | 72.5 |
|  | 3,500 | 58.2 |
|  | 1,400 | 229.5 |
|  | 1,500 | 520.3 |
|  | 1,750 | 143.7 |
| 1562° F.(850° C.) | 1,800 | 145.9 |
|  | 2,200 | 48.3 |
|  | 2,500 | 106.5 |

TABLE 7-continued

Heat WC70, time to rupture

| TEMPERATURE | STRESS (psi) | TIME(hrs) |
|---|---|---|
| | 700 | 2205.0 |
| | 750 | 326.5 |
| | 800 | 177.4 |
| 1652° F.(900° C.) | 900 | 156.1 |
| | 1,100 | 61.2 |
| | 1,300 | 25.1 |
| | 1,500 | 37.8 |

TABLE 8

Heat WC71, time to 1% creep strain

| TEMPERATURE | STRESS (psi) | TIME(h) |
|---|---|---|
| 1472° F.(800° C.) | 2,000 | 370.0 |
| | 2,200 | 350.0 |
| | 2,300 | 87.5 |
| | 2,450 | 185.0 |
| | 2,500 | 14.0 |
| | 3,000 | 30.0 |
| | 1,700 | 92.5 |
| | 1,800 | 75.0 |
| 1562° F.(850° C.) | 2,000 | 53.0 |
| | 2,500 | 11.3 |
| | 1,500 | 66.0 |
| | 1,600 | 28.0 |
| 1652° F.(900° C.) | 1,700 | 22.0 |
| | 1,800 | 7.5 |
| | 2,000 | 5.0 |

TABLE 9

Heat WC71, time to 2% creep strain

| TEMPERATURE | STRESS (psi) | TIME(hrs) |
|---|---|---|
| 1472° F.(800° C.) | 2,000 | 650.0 |
| | 2,200 | 505.0 |
| | 2,300 | 156.3 |
| | 2,450 | 285.0 |
| | 2,500 | 29.0 |
| | 3,000 | 48.0 |
| | 1,700 | 192.5 |
| | 1,800 | 180.0 |
| 1562° F.(850° C.) | 2,000 | 101.0 |
| | 2,500 | 21.0 |
| | 1,500 | 86.0 |
| | 1,600 | 60.0 |
| 1652° F.(900° C.) | 1,700 | 33.0 |
| | 1,800 | 12.5 |
| | 2,000 | 10.0 |

TABLE 10

Heat WC71, time to rupture

| TEMPERATURE | STRESS (psi) | TIME(hrs) |
|---|---|---|
| 1472° F.(800° C.) | 2,200 | 954.4 |
| | 2,300 | 379.8 |
| | 2,450 | 662.4 |
| | 2,500 | 239.8 |
| | 3,000 | 131.0 |
| | 1,700 | 372.0 |
| | 1,800 | 652.9 |
| 1562° F.(850° C.) | 2,000 | 287.0 |
| | 2,500 | 45.5 |
| | 1,500 | 203.4 |

TABLE 10-continued

Heat WC71, time to rupture

| TEMPERATURE | STRESS (psi) | TIME(hrs) |
|---|---|---|
| | 1,600 | 175.0 |
| | 1,600 | 188.9 |
| 1652° F.(900° C.) | 1,700 | 83.0 |
| | 1,800 | 37.8 |
| | 2,000 | 56.2 |

TABLE 11

Heat WC73, time to 1% creep strain

| TEMPERATURE | STRESS (psi) | TIME(hrs) |
|---|---|---|
| 1472° F.(800° C.) | 2,500 | 210.0 |
| | 2,600 | 200.0 |
| | 2,800 | 120.0 |
| | 3,000 | 75.0 |
| | 3,200 | 375.0 |
| | 3,350 | 60.0 |
| | 1,500 | 390.0 |
| | 1,750 | 500.0 |
| | 1,850 | 410.0 |
| 1562° F.(850° C.) | 1,900 | 122.0 |
| | 2,000 | 36.0 |
| | 2,500 | 2.3 |
| | 1,000 | 435.0 |
| | 1,150 | 75.0 |
| | 1,200 | 35.0 |
| 1652° F.(900° C.) | 1,400 | 62.5 |
| | 1,600 | 57.0 |
| | 1,800 | 6.8 |
| | 2,000 | 2.3 |

TABLE 12

Heat WC73, time to 2% creep strain

| TEMPERATURE | STRESS (psi) | TIME(hrs) |
|---|---|---|
| 1472° F.(800° C.) | 2,500 | 355.0 |
| | 2,600 | 365.0 |
| | 2,800 | 161.3 |
| | 3,000 | 127.5 |
| | 3,200 | 380.0 |
| | 3,350 | 90.0 |
| | 1,500 | 870.0 |
| | 1,750 | 745.0 |
| | 1,850 | 503.8 |
| 1562° F.(850° C.) | 1,900 | 185.0 |
| | 2,000 | 77.0 |
| | 2,500 | 5.1 |
| | 1,000 | 742.5 |
| | 1,150 | 137.5 |
| | 1,200 | 88.0 |
| 1652° F.(900° C.) | 1,400 | 125.0 |
| | 1,600 | 71.0 |
| | 1,800 | 13.5 |
| | 2,000 | 5.0 |

TABLE 13

Heat WC73, time to rupture

| TEMPERATURE | STRESS (psi) | TIME(hrs) |
|---|---|---|
| 1472° F.(800° C.) | 2,500 | 862.4 |
| | 2,600 | 807.2 |
| | 2,800 | 310.3 |
| | 3,000 | 292.4 |

TABLE 13-continued

Heat WC73, time to rupture

| TEMPERATURE | STRESS (psi) | TIME(hrs) |
|---|---|---|
| | 3,200 | 390.2 |
| | 3,350 | 200.0 |
| | 1,750 | 894.3 |
| | 1,850 | 557.5 |
| 1562° F.(850° C.) | 1,900 | 226.5 |
| | 2,000 | 266.1 |
| | 2,500 | 39.3 |
| | 1,150 | 316.6 |
| | 1,200 | 270.0 |
| 1652° F.(900° C.) | 1,400 | 270.5 |
| | 1,600 | 132.0 |
| | 1,800 | 52.5 |
| | 2,000 | 24.5 |

TABLE 14

Heat WC75, time to 1% creep strain

| TEMPERATURE | STRESS (psi) | TIME(hrs) |
|---|---|---|
| 1472° F.(800° C.) | 2,350 | 225.0 |
| | 2,500 | 825.0 |
| | 2,550 | 130.0 |
| | 2,650 | 50.0 |
| | 2,750 | 145.0 |
| | 2,800 | 62.5 |
| | 3,000 | 47.0 |
| | 1,400 | 8.0 |
| | 1,500 | 400.0 |
| | 2,000 | 360.0 |
| 1562° F.(850° C.) | 2,050 | 102.0 |
| | 2,150 | 32.0 |
| | 2,200 | 60.0 |
| | 2,500 | 19.0 |
| | 1,000 | 1125.0 |
| | 1,100 | 105.0 |
| | 1,200 | 6.5 |
| 1652° F.(900° C.) | 1,400 | 40.0 |
| | 1,500 | 27.0 |
| | 1,800 | 4.5 |
| | 2,000 | 3.5 |

TABLE 15

Heat WC75, time to 2% creep strain

| TEMPERATURE | STRESS (psi) | TIME(hrs) |
|---|---|---|
| 1472° F.(800° C.) | 2,350 | 365.0 |
| | 2,550 | 240.0 |
| | 2,650 | 102.5 |
| | 2,750 | 188.0 |
| | 2,800 | 118.8 |
| | 3,000 | 72.5 |
| | 1,400 | 17.0 |
| | 1,500 | 665.0 |
| | 2,000 | 550.0 |
| 1562° F.(850° C.) | 2,050 | 140.0 |
| | 2,150 | 56.0 |
| | 2,200 | 74.0 |
| | 2,500 | 48.0 |
| | 1,000 | 315.0 |
| | 1,100 | 152.5 |
| | 1,200 | 15.0 |
| 1652° F.(900° C.) | 1,400 | 78.0 |
| | 1,500 | 42.5 |
| | 1,800 | 10.0 |
| | 2,000 | 6.5 |

TABLE 16

Heat WC75, time to rupture

| TEMPERATURE | STRESS (psi) | TIME(hrs) |
|---|---|---|
| 1472° F.(800° C.) | 2,350 | 858.5 |
| | 2,550 | 494.4 |
| | 2,650 | 245.7 |
| | 2,750 | 253.9 |
| | 2,800 | 293.5 |
| | 3,000 | 147.0 |
| | 2,050 | 269.8 |
| | 2,100 | 140.0 |
| | 2,200 | 171.4 |
| 1562° F.(850° C.) | 2,500 | 75.6 |
| | 1,100 | 470.0 |
| | 1,200 | 64.2 |
| 1652° F.(900° C.) | 1,400 | 180.3 |
| | 1,500 | 131.1 |
| | 1,800 | 58.4 |
| | 2,000 | 40.4 |

Considering FIGS. 3–5, compositional modifications do not appear to make a substantial difference in creep resistance at the lowest test temperature, 800° C. (1472° F.). Increasing the temperature to 850° C. (1562° F.) resulted in some differentiation between the creep resistance of standard and modified alloys. Testing at 900° C. (1652° F.) revealed a clear separation of creep strength performance between the various alloys. The modified alloys (heats WC71, WC73, and WC75) demonstrated generally increased resistance to creep at higher test temperatures in comparison to the standard alloy (heat WC70). Results were consistent at high test temperatures for tests performed to determine time to 1% creep, 2% creep, and rupture, with the modified alloys demonstrating superior creep, resistance compared to the standard alloy. For example, based on the test data it will be seen that the modified alloys exhibited a creep rupture strength of at least 1000 psi at 900° C. (1652° C.) for 400 hours, a time to 1% creep strain of at least 100 hours at 900° C. (1652° C.) under load of 1000 psi, and a time to 2% creep strain of at least 200 hours at 900° C. (1652° F.) under load of 1000 psi. In contrast, based on the test data the standard alloy (WC70) exhibited creep rupture life of only about 156 hours at the lower stress of 900 psi at 900° C. (1652° F.). The standard alloy of heat WC70 also exhibited 1% creep strain in 2.5 hours at 900° C. (1652° F.) under load of 900 psi, and a time to 2% creep strain of only 5.0 hours at 900° C. (1652° F.) under load of 900 psi. These differences illustrate the substantial improvements in creep and rupture resistance that result from the alloy modification.

The modified alloys' improved resistance to creep in high temperature environments makes the alloys suitable for use in SOFC's, as well as other high temperature applications.

IV. Oxidation Testing

The isothermal oxidation behavior of the various alloys (heats WC70–WC75) was investigated. Duplicate alloy samples were exposed for 500 hours at 800° C. (1472° F.) and 900° C. (1652° F.). The samples were first degreased to remove grease and oils from the surface of the metal. Next, the samples were weighed, placed in alumina crucibles, and exposed for set lengths of time to high temperatures in ambient laboratory air in a box furnace constructed with a solid hearth. Periodically, the samples were removed, weighed, and returned to the test furnace. The measured weight changes were divided by the area of the sample, resulting in a curve of specific weight change (mg/cm$^2$) as a function of time.

Figure 6:
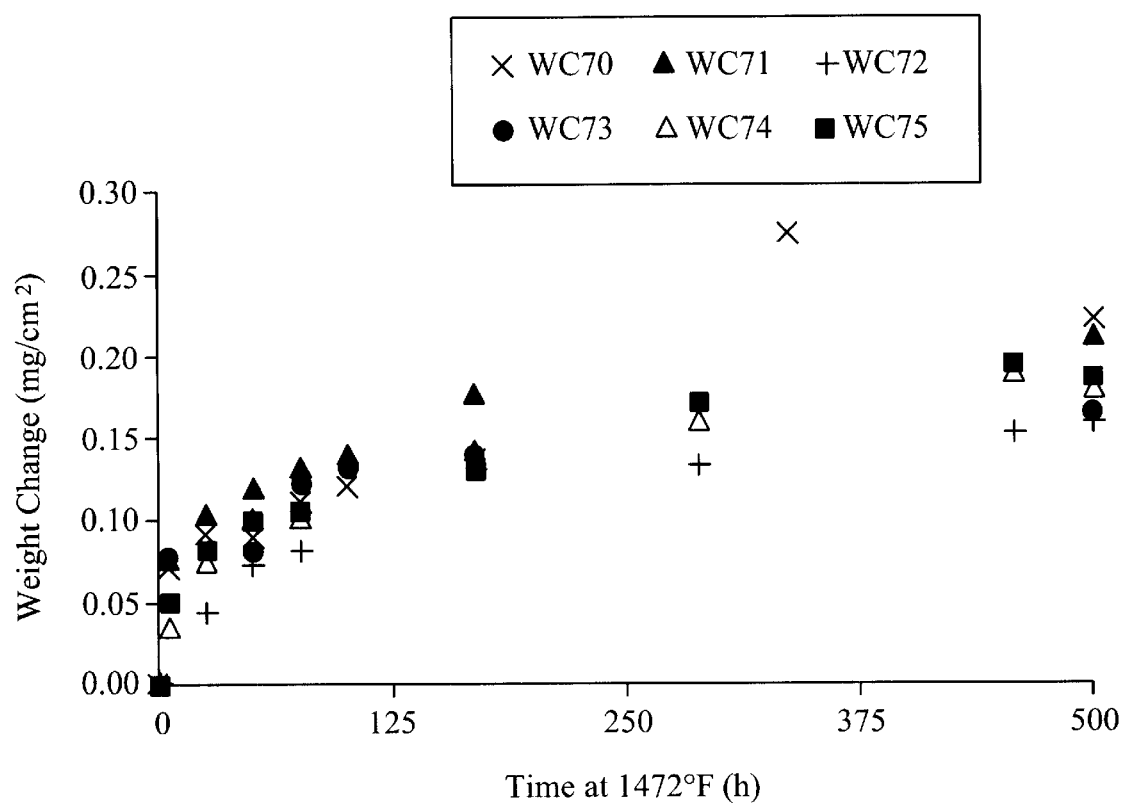
FIG. 6 is a graph of weight change as a function of exposure time to ambient air at (800° C. (1472° F.) and depicts isothermal oxidation data for several ferritic stainless steels.

As shown in FIG. 6, isothermal oxidation testing at 800° C. (1472° F.) resulted in similar weight changes for all of the samples. The standard alloy heat (heat WC70) exhibited a slightly higher weight gain after 336 hours. However, after 500 hours the weight gain was similar among all samples. As there was no evidence of scale spallation (separation of particles from the surface in the form of flakes), the skewed data point in FIG. 5 of the heat WC70 sample at 336 hours may have been caused by an inaccurate measurement. All of the specimens exhibited a uniform charcoal gray color with no evidence of discoloration or localized attack.

Figure 7:
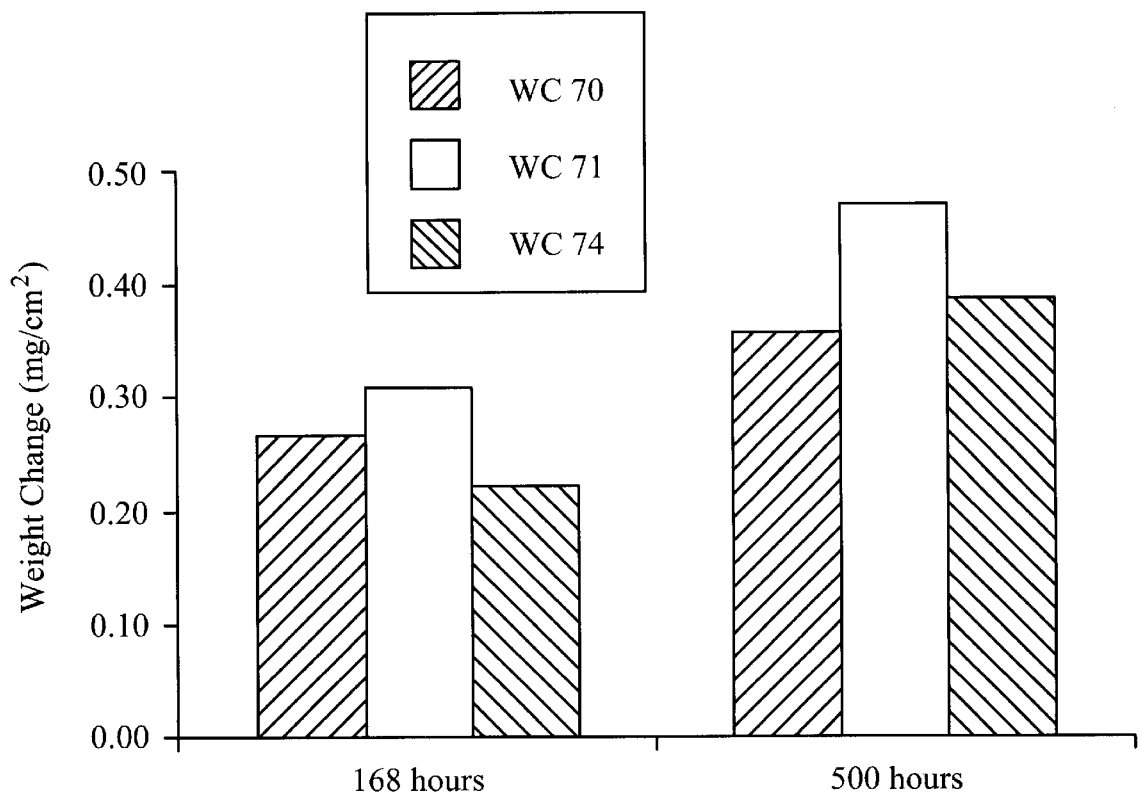
FIG. 7 depicts isothermal oxidation data obtained on exposing several ferritic stainless steels to ambient air at 800° C. (1472° F.)

As shown in FIG. 7, isothermal oxidation testing at 850° C.(1562° F.) was limited to three samples, heats WC70, WC71, and WC74. The sample from heat WC71, which was modified relative to the standard alloy solely in niobium content, exhibited a higher weight gain than either the standard alloy (heat WC70) or the alloy modified with additions of niobium, cerium, and lanthanum (heat WC74). This difference was discernable after 168 hours and became more evident after 500 hours.

Figure 8:
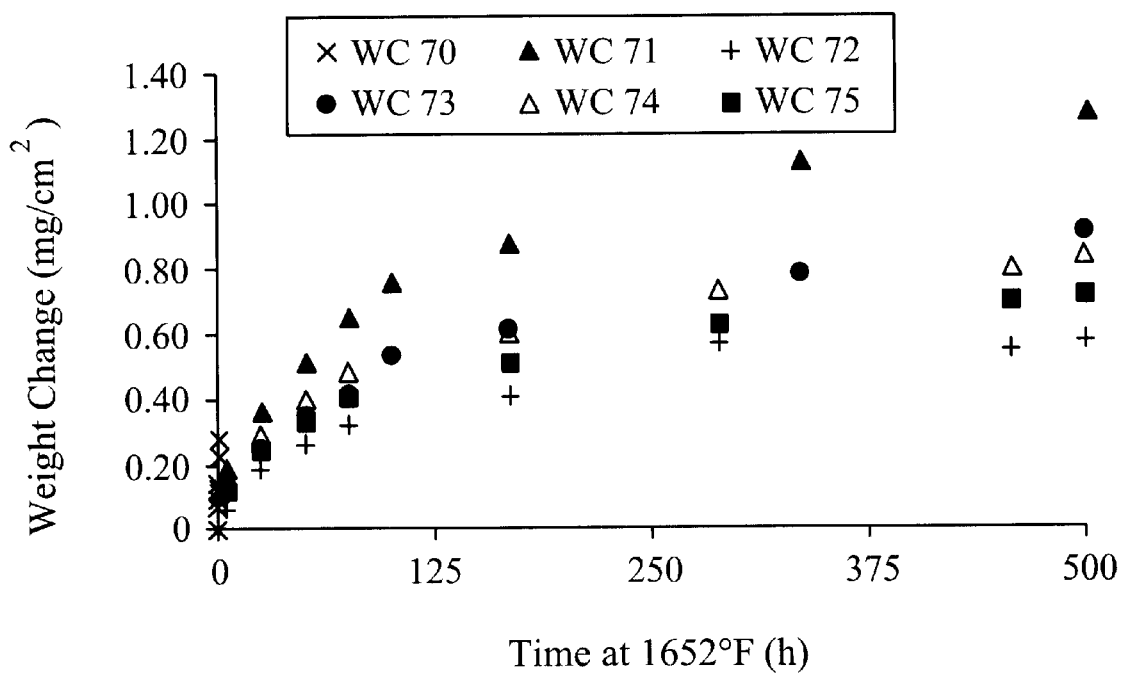
FIG. 8 depicts the isothermal oxidation data obtained on exposing several ferritic stainless steels to ambient air at 900° C. (1652° F.)

As depicted by FIG. 8, exposures at 900° C. (1652° F.) displayed results similar to those seen at the lower temperatures. Once again, the alloy modified solely by addition of niobium (heat WC71) exhibited a slightly higher weight gain than either the standard alloy (heat WC70) or the modified alloy containing increased niobium, cerium, and lanthanum (heat WC74). The specimens formed a relatively uniform charcoal gray oxide scale with a greenish undertone. Some evidence of localized discoloration was perceptible.

The parabolic rate constant is a measure of the rate of oxidation. The constant summarizes an entire weight change curve at a given temperature. The parabolic rate equation is of the form: $\Delta M/A = k_p \sqrt{t}$, where $\Delta M/A$=specific weight change in mg/cm$^2$, t=time, and $k_p$=parabolic rate constant. Parabolic rate constants from 500 hour oxidation exposure trials on each of the alloys are listed below in Table 17.

TABLE 17

| Exposure Temperature | Rate constant (g$^2$/cm$^4$h) | | | | | |
|---|---|---|---|---|---|---|
| | WC70 | WC71 | WC72 | WC73 | WC74 | WC75 |
| 1472° F./ 800° C. | −13.5 | −13.7 | −13.8 | −13.9 | −13.8 | −13.7 |
| 1652° F./ 900° C. | −12.1 | −11.9 | −12.5 | −12.2 | −12.2 | −12.2 |

The calculated values are essentially within the scatter (±0.25 on a logarithmic scale) for the exposures performed.

Figure 9:
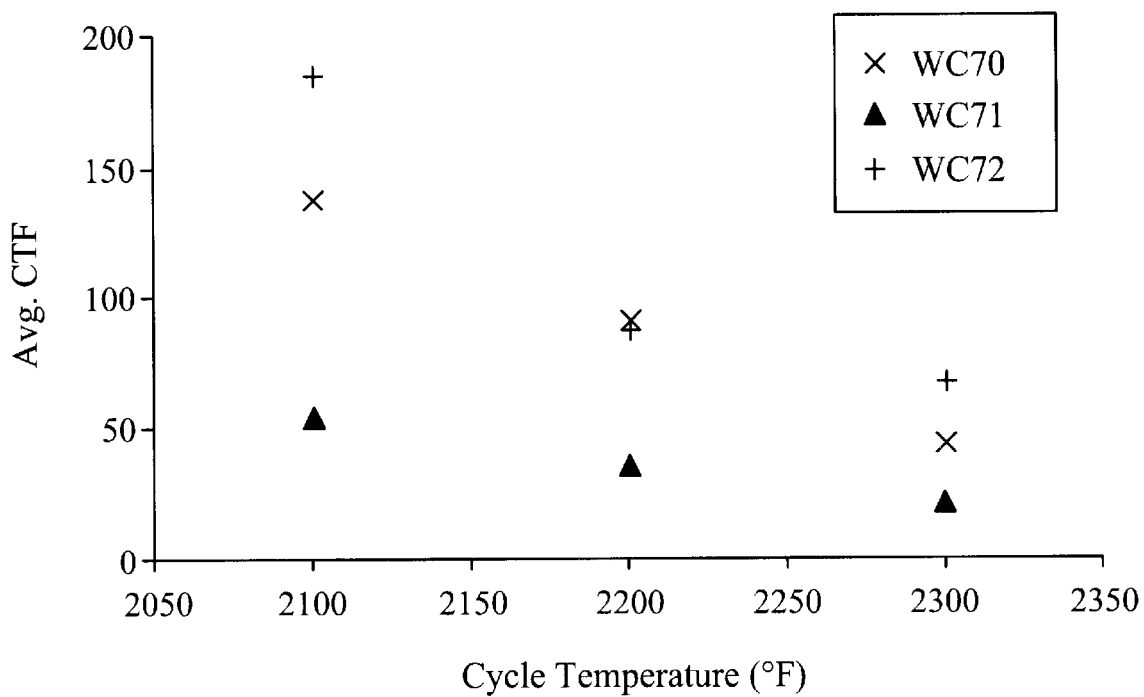
FIG. 9 depicts average cycles-to-failure (CTF) values as a function of cycle temperature for 0.002" thick samples of several ferritic stainless steels.

Oxidation under conditions of thermal cycling is generally more severe than oxidation at a constant temperature. A significant difference usually exists in the coefficient of thermal expansion of oxides and metals. This can lead to the generation of high levels of stress during thermal cycling, resulting in the premature detachment of the protective oxide layer, known as spallation. Oxide spallation exposes bare metal, which then rapidly re-oxidizes. Samples of the modified alloy heats were rolled to 0.002 inch (0.051 mm) thick foil and stamped into cyclic oxidation test specimens. These samples were then tested. An electrical current was used to heat the samples for two minutes, and the samples were then rapidly cooled to room temperature. After two minutes at ambient, the samples were cycled back to a test temperature. The total number of cycles before filament breakage, caused by through-thickness oxidation, is used as a measure of resistance to oxidation under cyclic conditions. Samples were tested in duplicate at 2100° F. (1149° C.), 2200° F. (1204° C.), and 2300° F. (1260° C.). The results depicted in FIG. 9 indicate that the heat modified with addition of niobium (heat WC71) exhibited poor cyclic oxidation resistance, continuing the general trend noted in the isothermal oxidation tests. (CTF in FIG. 9 is "cycles to failure.")

V. Coefficient of Thermal Expansion

As discussed above, CTE is a critical property of fuel cell interconnect materials. If the mismatch between the CTE's of the interconnect and the ceramic components of the fuel cell is too great, the mechanical integrity of the cell, particularly the seals between cell layers, can be compromised. Accordingly, in the stainless steel of the present invention, the CTE is within a range of about 25% of the CTE of stabilized zirconia, the conventional electrolyte in SOFC's, between 20° (68° F.) and 1000° C. (1832° F.). For reasons described above, it is preferred that the CTE of the steel is at least as great, and may be up to about 25% greater than, the CTE of stabilized zirconia between 20° C. (68° F.) and 1000° C. (1832° F.).

Samples of conventional E-BRITE® alloy were tested to determine average CTE. E-BRITE® alloy (UNS S44627) includes, in weight percent, 0.010 max. carbon, 0.40 max. manganese, 0.020 max. phosphorus, 0.020 max. sulfur, 0.40 max. silicon, 25.0–27.5 chromium, 0.50 max. nickel, 0.75–1.50 molybdenum, 0.015 max. nitrogen, 0.20 max. copper, 0.05–0.20 niobium, and 0.50 max. (nickel+copper). The CTE test results are provided in Table 18 below.

TABLE 18

| Test Temperature | | Testing Laboratory A (× 10$^{-6}$/° C.) | | Testing Laboratory B (× 10$^6$/° C.) | |
|---|---|---|---|---|---|
| (° C.) | (° F.) | Longitudinal | Transverse | Longitudinal | Transverse |
| 40 | 104 | — | — | 8.21 | 10.22 |
| 100 | 212 | 9.93 | 9.28 | 9.37 | 10.04 |
| 200 | 392 | 10.38 | 9.81 | 9.98 | 10.25 |
| 300 | 572 | 10.73 | 10.2 | 10.34 | 10.54 |
| 400 | 752 | 10.93 | 10.53 | 10.6 | 10.79 |
| 500 | 932 | 11.16 | 10.87 | 10.89 | 11.06 |
| 600 | 1112 | 11.35 | 11.06 | 11.09 | 11.3 |
| 700 | 1292 | 11.68 | 11.33 | 11.45 | 11.61 |
| 800 | 1472 | 12.18 | 11.76 | 11.93 | 12.06 |
| 900 | 1652 | 12.58 | 12.24 | 12.53 | 12.58 |
| 998 | 1810 | 13.02 | — | — | — |
| 1000 | 1832 | — | 12.74 | 13.05 | 13.12 |

The E-BRITE® alloy's low carbon limit and limitations on nickel and copper (individually and combined) are relaxed in the alloy of the present invention as broadly described herein. It is believed that such variation would have no appreciable influence on the thermal expansion properties of the alloy. It also is believed that including at least of the niobium, titanium, and tantalum in the alloy of the present invention so as to satisfy the equation $$0.4 \leq (\%Nb + \%Ti + \frac{1}{2}(\%_{Ta})) \leq 1$$

would not effect the CTE of the alloy substantially. All CTE values in Table 18 are within about 25% of 11×10$^{-6}$ per ° C., which is the approximate CTE of YSZ between 20° C. (68° F.) and 1000° C. (1832° F.).

Accordingly, the above testing results demonstrate that the ferritic stainless steel of the present has improved high temperature mechanical properties relative to a standard ferritic stainless steel. For example, relative to E-BRITE® ferritic stainless steel, the stainless steel of the present invention exhibits improved microstructural stability, enhanced mechanical properties, and greater resistance to creep at high temperatures.

Any suitable conventional melting and refining practices may be used to prepare slabs or ingots of the steel of the present invention. The slabs or ingot may be further processed in a conventional manner to product such as strip, sheet, or plate, solution annealed and, optionally, precipitation heat treated. For the contemplated fuel cell application, the steel may be precipitation heat treated at the use temperature (about 1600 to 1830° F. (871 to 999° C.)). When lower use temperatures are involved, it may be desirable to precipitation harden the steel by exposing it to a temperature of about 1600° F. (871° C.) for a time sufficient to suitably strengthen the material.

The steel may be fabricated into components for SOFC's including a stabilized zirconia-containing electrolyte. Such components include separators and interconnects for SOFC's including electrolyte containing stabilized zirconia. The steel also may be processed into components for oxygen sensor devices including stabilized zirconia, or into articles for other high temperature applications, such as for use in high temperature furnace hardware and equipment for handling molten copper and other molten metals. As an example, SOFC's including the ferritic stainless steel of the present invention may include a ceramic anode, a ceramic cathode, and a stabilized zirconia electrolyte intermediate the anode and cathode. The SOFC's also may include at least one of an interconnect and a separator including the present ferritic stainless and disposed adjacent the ceramic electrolyte.

It is to be understood that the foregoing description illustrates those aspects of the invention relevant to a clear understanding of the invention. Certain aspects of the invention that would be apparent to those of ordinary skill in the art and that, therefore, would not facilitate a better understanding of the invention have not been presented in order to simplify the present description. Although the present invention has been described in connection with certain embodiments, those of ordinary skill in the art will,upon considering the foregoing description, recognize that many modifications and variations of the invention may be employed. It is intended that all such variations and modifications of the inventions be covered by the foregoing description and following claims.

What is claimed is:

1. A ferritic stainless steel comprising:

greater than 25 weight percent chromium;

0.75 to less than 1.5 weight percent molybdenum;

up to 0.05 weight percent carbon; and at least one of niobium, titanium, and tantalum, wherein the sum of the weight percentages of niobium, titanium, and tantalum satisfies the equation $$0.5 \leq (\%Nb + \%Ti + \tfrac{1}{2}(\%Ta)) \leq 1,$$

wherein the steel includes no more than 0.50 weight percent titanium, the coefficient of thermal expansion of the steel is within about 25% of the coefficient of thermal expansion of stabilized zirconia between 20° C. (68° F.) and 1000° C. (1832° F.), and wherein the steel exhibits at least one creep property selected from creep rupture strength of at least 1000 psi at 900° C. (1652° F.), time to 1% creep strain of at least 100 hours at 900° C. (1652° F.) under load of 1000 psi, and time to 2% creep strain of at least 200 hours at 900° C. (1652° F.) under load of 1000 psi.

2. The ferritic stainless steel of claim 1, wherein the coefficient of thermal expansion of the steel is at least as great as the coefficient of thermal expansion of stabilized zirconia between 20° C. (68° F.) and 1000° C. (1832° F.).

3. The ferritic stainless steel of claim 1, wherein the coefficient of thermal expansion of the steel is within about 25 percent of the coefficient of thermal expansion of yttria-stabilized zirconia between 20° C. (68° F.) and 10° C. (1832° F.).

4. The ferritic stainless steel of claim 1, wherein the steel includes no more than 0.005 weight percent carbon.

5. The ferritic stainless steel of claim 1, further comprising at least one element selected from the group consisting of up to 0.1 weight percent cerium, up to 0.05 weight percent lanthanum, and up to 0.05 weight percent zirconium.

6. The ferritic stainless steel of claim 1, wherein the steel includes no more than 35 weight percent chromium.

7. The ferritic stainless steel of claim 1, wherein the sum of the weight percentages of niobium, titanium, and tantalum satisfies the equation $$0.5 \leq (\%Nb + \%Ti + \tfrac{1}{2}(\%Ta)) \leq 0.75.$$

8. A ferritic stainless steel comprising:

25 up to 35 weight percent chromium;

0.75 to less than 1.5 weight percent molybdenum;

up to 0.005 weight percent carbon;

at least one of niobium, titanium, and tantalum, wherein the steel includes no more than 0.50 weight percent titanium, and the sum of the weight percentages of niobium, titanium, and tantalum satisfies the equation $$0.5 \leq (\%Nb + \%Ti + \tfrac{1}{2}(\%Ta)) \leq 0.75,$$

wherein the coefficient of thermal expansion of the steel is within about 25 percent of the coefficient of thermal expansion of stabilized zirconia between 20° C. (68° F.) and 1000° C. (1832° F.), and wherein the steel, exhibits at least one creep property selected from creep rupture strength of at least 1000 psi at 900° C. (1652° F.), time to 1% creep strain of at least 100 hours at 900° C. (1652° F.) under load of 1000 psi, and time to 2% creep strain of at least 200 hours at 900° C. (1652° F.) under load of 1000 psi.

9. The ferritic stainless steel of claim 8, wherein the coefficient of thermal expansion of the steel is at least as great as the coefficient of thermal expansion of stabilized zirconia between 20° C. (68° F.) and 1000° C. (1832° F.).

10. The ferritic stainless steel of claim 8, wherein the coefficient of thermal expansion of the steel is at least as great as the coefficient of thermal expansion of yttria-stabilized zirconia between 20° C. (68° F.) and 1000° C. (1832° F.).

11. A method for making a ferritic stainless steel, the steel having a coefficient of thermal expansion within about 25 percent of the coefficient of thermal expansion of stabilized zirconia between 20° C. (68° F.) and 1000° C. (1832° F.), and at least one creep property selected from creep rupture strength of at least 1000 psi at 900° C. (1652° F.), time to 1% creep strain of at least 100 hours at 900° C. (1652° F.) under load of 1000 psi, and time to 2% creep strain of at least 200 hours at 900° C. (1652° F.) under load of 1000 psi, the method comprising:

providing a ferritic stainless steel comprising greater than 25 weight percent chromium, 0.75 to less than 1.5 weight percent molybdenum, up to 0.05 weight percent carbon, and at least one of niobium, titanium, and tantalum, wherein the steel includes no more than 0.50 weight percent titanium, and the sum of the weight percentages of niobium, titanium, and tantalum satisfies the equation $$0.5 \leq (\%Nb + \%Ti + \tfrac{1}{2}(\%Ta)) \leq 1;$$

and solution annealing the steel.

12. The method of claim 11, further comprising optionally hardening the steel by precipitation heat treating the steel.

13. The method of claim 11, wherein solution annealing the steel comprises heating the steel at a temperature that is at least the greater of the intended service temperature of the steel and 1600° F. (871° C.).

14. The method of claim 11, wherein the coefficient of thermal expansion of the steel is at least as great as the coefficient of thermal expansion of stabilized zirconia between 20° C. (68° F.) and 1000° C. (1832° F.).

15. The method of claim 11, wherein the coefficient of thermal expansion of the steel is within about 25% of the coefficient of thermal expansion of yttria-stabilized zirconia between 20° C. (68° F.) and 1000° C. (1832° F.).

16. The method of claim 11, wherein the steel includes no more than 0.005 weight percent carbon.

17. The method of claim 11, wherein the steel further comprises at least one element selected from the group consisting of up to 0.1 weight percent cerium, up to 0.05 weight percent lanthanum, and up to 0:05 weight percent zirconium.

18. The method of claim 11, wherein the steel includes no more than 35 weight percent chromium.

19. The method of claim 11, where in the sum of the weight percentages of niobium, titanium, and tantalum in the steel satisfies the equation $$0.5 \leq (\%Nb + \%Ti + \tfrac{1}{2}(\%Ta)) \leq 0.75.$$

20. The method of claim 11, wherein the steel comprises 25 up to 35 weight percent chromium, 0.75 to less than 1.5 weight percent molybdenum, up to 0.005 weight percent carbon, and at least one of niobium, titanium, and tantalum, wherein the steel includes no more than 0.50 weight percent titanium, and the sum of the weight percentages of niobium, titanium, and tantalum satisfies the equation $$0.5 \leq (\%Nb + \%Ti + \tfrac{1}{2}(\%Ta)) \leq 0.75.$$

* * * * *